Aug. 3, 1965    E. P. D'AZZO    3,197,875
SLEEVE MEASURING DEVICE
Filed Jan. 19, 1962    2 Sheets-Sheet 1

INVENTOR.
EDWARD D'AZZO
BY
Caesar and Rivise
ATTORNEYS.

Aug. 3, 1965     E. P. D'AZZO     3,197,875
SLEEVE MEASURING DEVICE
Filed Jan. 19, 1962     2 Sheets-Sheet 2
FIG. 5     FIG. 6
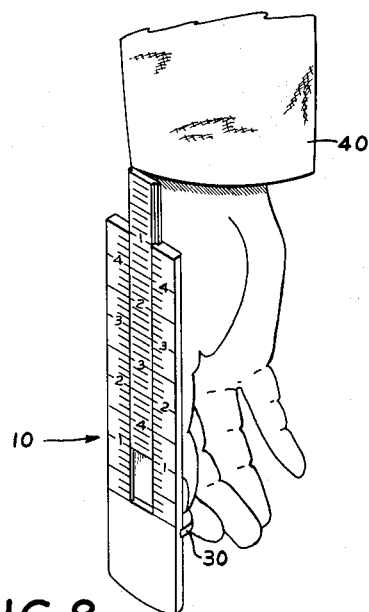
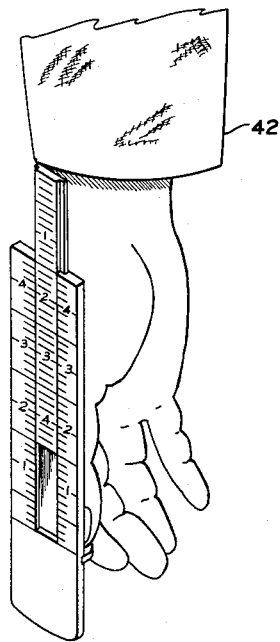
FIG. 8     FIG. 7
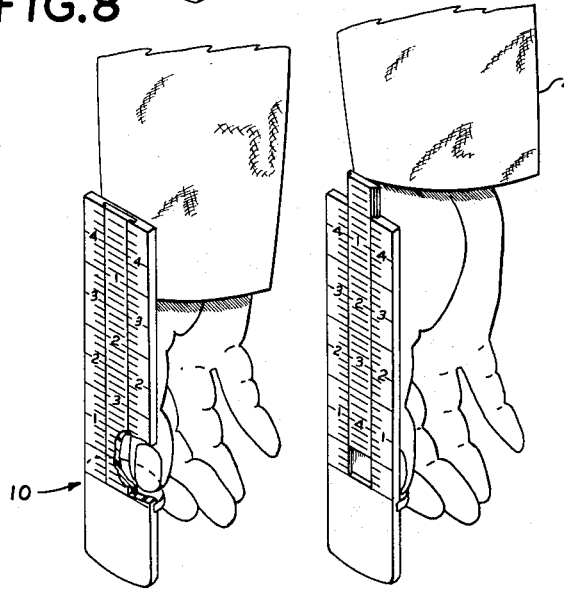
INVENTOR.
EDWARD D'AZZO
BY
Caesar and Rivise
ATTORNEYS.

3,197,875
Patented Aug. 3, 1965

3,197,875
SLEEVE MEASURING DEVICE
Edward P. D'Azzo, College Point, N.Y., assignor to H. Daroff & Sons, Inc., Philadelphia, Pa., a corporation of Pennsylvania
Filed Jan. 19, 1962, Ser. No. 167,258
3 Claims. (Cl. 33—169)

This invention relates to a novel method and device for adjusting the length of the sleeves on a jacket, coat or other wearing apparel.

It is a matter of common knowledge that sleeves in ready-made outer garments usually do not possess the exact length desired by the purchaser. One reason for this is that a man's arms are not usually of the same length, whereas the sleeves on a ready-made garment are. In most cases when an outer jacket is purchased, the sleeve length must be adjusted to suit the customer. In the past, this adjustment was carried out by a tailor who estimated the approximate length that a sleeve should be and by an appropriate chalk marking on the sleeve, indicated the amount of lengthening or shortening required.

The aforementioned method in many cases proved to be inaccurate. No exact measurements were ever made and the amount of alteration made depended on how trained the tailor's eye was. In many cases when the chalk markings were made by clothing salesmen, and not tailors, the results proved to be even more inaccurate.

Using the device of this invention, sleeve length can be accurately adjusted to within a small fraction of an inch. Furthermore, once a purchaser decides the appropriate length that he desires for his sleeves, this length can be accurately maintained whenever any subsequent garment is altered.

One of the main difficulties of visual alteration is that there was never any pre-determined point of reference made to determine how long the sleeves should be. This invention utilizes the discovery that the tip of the thumb can provide a very accurate reference point for determining the precise length of a sleeve.

It is therefore an object of this invention to provide a novel method and device for accurately adjusting the sleeve length of a garment.

It is another object of this invention to provide a sleeve measuring device which is simple in construction and useable by any clothing salesman, regardless of his tailoring skill.

These and other objects are accomplished by providing a sleeve measuring device comprising two elongated walls, each wall being internally grooved to provide a channel therein, a bar slidable within said channel, means joining the elongated walls at one end thereof and means to support a thumb secured to said joining means.

Other objects and many of the attendant advantages of this invention will be readily appreciated as the same becomes better understood by reference to the following detailed description when considered in connection with the accompanying drawings wherein:

FIG. 5 is a perspective view showing the device of this invention in operative position, and depicting a sleeve at its proper length;

FIG. 6 is a perspective view similar to FIG. 5, but depicting a sleeve which is too short;

FIG. 7 is a view similar to FIG. 5, but depicting a sleeve which is too long; and FIG. 8 is a perspective view, similar to FIG. 5 but partially broken away for the purpose of clarity, showing the sleeve measuring device in operative position, and depicting a sleeve which is excessively long.

Figure 1:
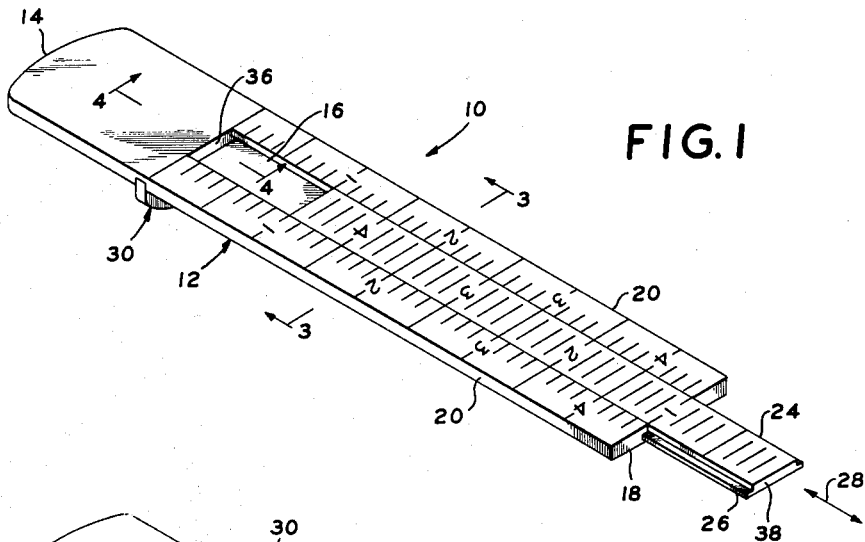
FIG. 1 is a perspective view of the sleeve measuring device of this invention, taken from the top thereof.
Figure 2:
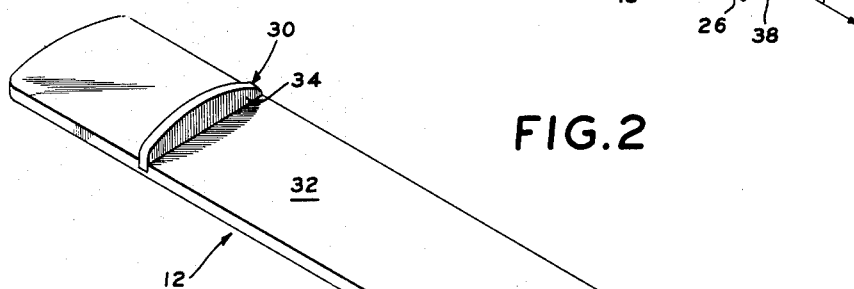
FIG. 2 is a perspective view of the sleeve measuring device of this invention, taken from the bottom thereof.

Referring now in greater detail to the various figures of the drawings, wherein similar reference characters refer to similar parts, a sleeve measuring device embodying the present invention is generally shown at 10 in FIG. 1. Device 10 basically comprises a bar 12 which is generally rectangular in shape, but is provided with an arcuate end 14 for ornamental purposes.

Figure 3:
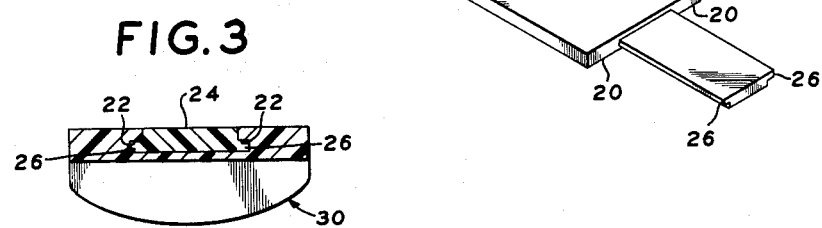
FIG. 3 is a sectional view taken along the line 3—3 of FIG. 1.

Bar 12 is provided with a rectangular recess 16 which extends longitudinally along a substantial portion of the upper surface of the bar and inwardly from end 18. Legs 20 extend on opposite sides of recess 16. Each leg 20 is provided with a longitudinal groove 22 (FIG. 3) which extends the entire length of recess 16 and is adjacent thereto.

Slidably mounted within recess 16 is a rod 24 having a cross-section of an inverted T. Rod 24 includes longitudinal tongues 26 which extend the entire length thereof and are received in grooves 22. Rod 24 is equal in length to recess 16, and slides back and forth within said recess in the directions of arrows 28.

Figure 4:
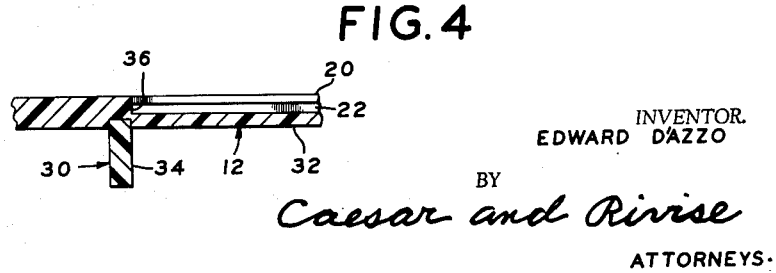
FIG. 4 is a sectional view taken along the line 4—4 of FIG. 1.

A shoulder 30 is perpendicularly glued or otherwise secured in the bottom surface 32 of bar 12 (FIG. 4). The forward face 34 of shoulder 30 lies in the same plane as the rear face 36 of recess 16 (FIG. 4).

The top surface of each leg 20 of bar 12 is calibrated in inches or other suitable dimensions. The dimensions increase upwardly starting with zero in the plane of rear or inner face 36 of recess 16. The rod 24 is also calibrated along its top surface in the same dimensions as legs 20. However, the calibrations of rod 24 increase in the opposite direction to those of legs 20. Thus, as seen in FIG. 1, the calibrations of the rod 24 start at zero on the outer end 38 of the rod 24.

As previously pointed out, rod 24 is exactly the same length as legs 20. Thus, whenever rod 24 is slid outwardly from recess 16, the amount of protrusion of the rod above end 18 of bar 12 can easily be determined by reading the calibrations on the rod.

The device of this invention can be fabricated of any number of materials. For ease of manufacture and durability, it is preferred to mold the device from a synthetic resin plastic, such as polystyrene, polyethylene, polyvinylidene chloride, or polytetrafluoroethylene. Other materials such as wood, aluminum, magnesium or steel can be used.

The method of using the device in this invention is illustrated in FIGS. 5 to 8. FIG. 5 illustrates a sleeve 40 which is at the desired length. In order to determine what this length is, the tip of the thumb of the wearer is used as a reference point. As illustrated in FIG. 5, the tip of the thumb is placed firmly against shoulder 30 of the device 10. The rear surface 32 is then placed flush against the outer surface of the thumb pointing upward toward the wrist. Rod 24 is then slid upwardly until the outer end of the rod is adjacent the level on the back of the hand which is the desired length of the sleeve. As seen in FIG. 5, the desired length measures 5½″ above the tip of the thumb, as determined by the device of the invention, inasmuch as bar 12 is 4½″ long and rod 24 projects 1″ thereabove.

FIG. 6 illustrates a sleeve 42 which is too short for the wearer. Assuming that 5½″ is the correct distance from the tip of the thumb for the wearer in FIG. 6, it will be noted that the sleeve is ½″ too short. This is easily determined by noting that the current sleeve length is 6″ above the tip of the thumb as measured by the device of this invention.

FIG. 7 illustrates a sleeve 44 which is too long for the wearer. Again assuming that 5½″ is the correct distance from the tip of the thumb, it will be noted that the sleeve in FIG. 7 is ½″ too long. Again, this is determined by noting that the current sleeve length is 5″ above the tip of the thumb as measured by the device of this invention.

After determining whether the sleeve is too long or too short, the amount of difference for each sleeve is noted on a tag or other paper by the clothing salesman. It is then a simple matter for the tailor to lengthen or shorten each sleeve to exactly the desired length.

As seen in FIG. 8, in some instances it is not necessary to use slidable rod 24 in determining the sleeve length. As shown in FIG. 8, the sleeve is presently 3½″ above the tip of the thumb. If 5½″ is the desired length, obviously the sleeve must be shortened by 2″. It should also be noted that device 10 is partially broken away in FIG. 8 to show the exact position of the thumb on the shoulder 30.

It is thus seen that the device of this invention provides a very simple and accurate means of determining the correct sleeve length of any garment. Using the tip of the thumb as a reference point always insures that the two sleeves of any garment will have the same relative position on a wearer.

Obviously many modifications and variations of the present invention are possible in the light of the above teachings. It is therefore to be understood that within the scope of the appended claims, the invention may be practiced otherwise than as specifically described.

What is claimed as the invention is:

1. A sleeve measuring device comprising a bar, said bar having a longitudinally extending rectangular recess formed in the top surface thereof, and having a pair of parallel legs on opposite sides of said recess, at least one of said legs being calibrated, said recess being open at one end and terminating in a vertical wall at the opposite end, a shoulder fixedly and perpendicularly secured in the rear face of said bar for supporting the tip of a thumb thereon, with one wall of said shoulder lying in the same plane as said vertical wall of said recess, and a calibrated rod slidably mounted within said recess.

2. The sleeve measuring device of claim 1, and including a pair of longitudinally extending grooves adjacent said recess, and a pair of longitudinally extending tongues on said rod which are slidably received within said grooves.

3. The sleeve measuring device of claim 1 wherein the bar, shoulder and rod are made of a synthetic plastic.

References Cited by the Examiner

UNITED STATES PATENTS

| | | | |
|---|---|---|---|
| 1,432,834 | 10/22 | Buck | 33—161 |
| 2,112,930 | 4/38 | Shulman et al. | 33—169 X |
| 2,125,530 | 8/38 | Verdier | 33—8 |
| 2,507,056 | 5/50 | Smith | 33—161 X |
| 2,734,270 | 2/56 | Finnegan | 33—8 |
| 2,840,912 | 7/58 | Montana | 33—2 |

ISAAC LISANN, *Primary Examiner.*